United States Patent [19]

Iio

[11] 4,099,793
[45] Jul. 11, 1978

[54] ANTI-SKID VEHICLE BRAKE SYSTEM WITH FLUID PRESSURE ACTUATED REGULATING VALVE

[75] Inventor: Toshimitsu Iio, Hamamatsu, Japan

[73] Assignee: Yamaha Hatsudoki Kabushiki Kaisha, Iwata, Japan

[21] Appl. No.: 713,843

[22] Filed: Aug. 12, 1976

[51] Int. Cl.² .............................................. B60T 8/02
[52] U.S. Cl. ..................................... 303/116; 303/68; 303/119
[58] Field of Search .................. 303/10, 100, 116, 117, 303/118, 119, 114, 115, 61–63, 68–69; 188/181 A, 181 R

[56] References Cited

U.S. PATENT DOCUMENTS

| 3,521,934 | 7/1970 | Leiber | 303/119 |
| 3,550,966 | 12/1970 | Leiber | 303/119 |
| 3,851,929 | 12/1974 | Grosseau | 303/117 |
| 3,893,693 | 7/1975 | Skoyles | 303/119 |

FOREIGN PATENT DOCUMENTS 2,212,711  9/1973  Fed. Rep. of Germany ....... 303/119

Primary Examiner—Stephen G. Kunin
Assistant Examiner—Douglas C. Butler
Attorney, Agent, or Firm—Dennis P. Clarke

[57] ABSTRACT

Anti-skid type vehicle brake system which comprises a master cylinder, one or more wheel brake actuators, a brake pressure supply line extending between master cylinder and brake pressure supply line, a fluid return line between master cylinder and brake pressure supply line, a skid control valve for connecting brake actuator to the return line when wheel lock or similar condition is detected, fluid pressure actuated regulating valve for introducing a restriction to the brake pressure supply line when actuated by fluid pressure produced in the return line.

7 Claims, 7 Drawing Figures

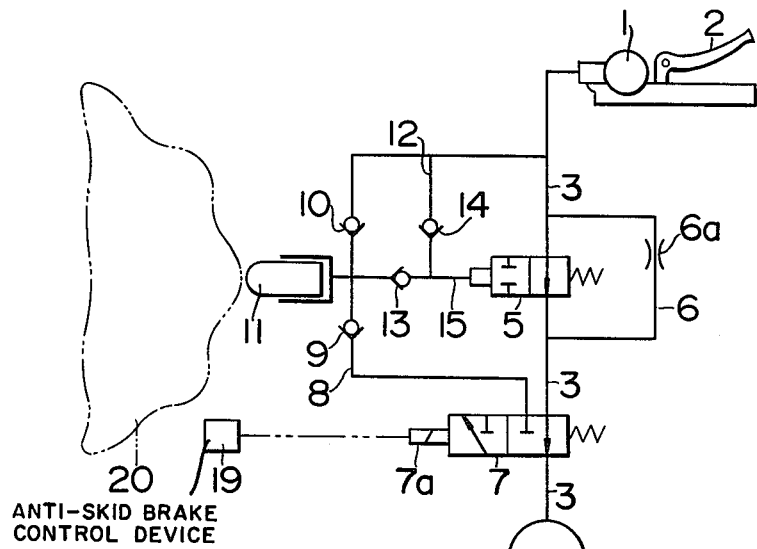
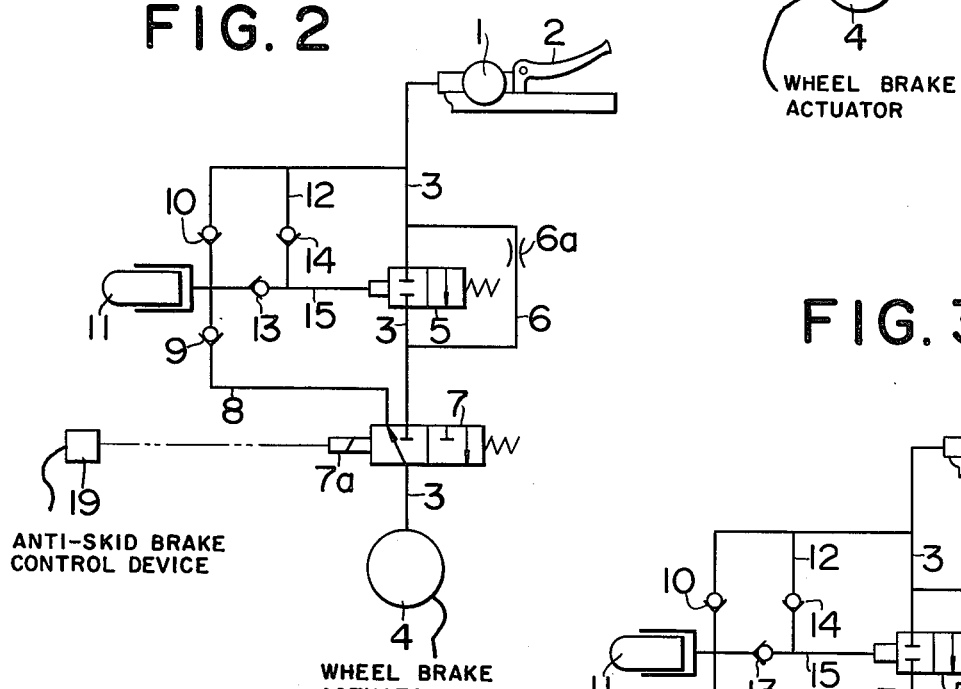
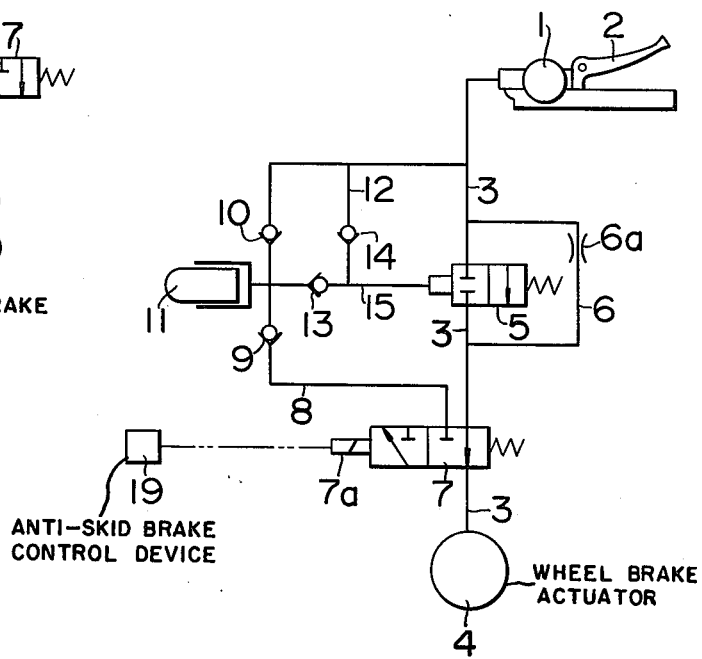

ANTI-SKID VEHICLE BRAKE SYSTEM WITH FLUID PRESSURE ACTUATED REGULATING VALVE

The present invention relates to vehicle brake systems and more particularly to brake systems suitable for use with relatively small vehicles such as motorcycles.

In vehicles, it has been recognized that excessive braking efforts applied to vehicle wheels often cause wheel lock and result in skidding of vehicles. In order to eliminate such skidding, there has already been proposed to provide a anti-skid brake system in which brake pressure is momentarily released or reduced when the wheel lock has been sensed so as to restore rotation of the wheel. When the rotation of the wheel is thus restored, the brake pressure is again increased. In this manner, brake pressure is repeatedly applied to the wheel avoiding wheel locking.

In conventional brake systems, the rate of increase in the brake pressure in the second or subsequent application of brake is the same as that of the first application. Therefore, if the rate of increase in the brake pressure is of such value that is sufficient to provide a required response in the first application of brake, excessive braking effort may be applied in the second or subsequent application. On the other hand, if the rate is of such a value that can avoid excessive braking effort in the second or subsequent brake application, it will not be possible to timely apply a desired braking effort at the first application.

In order to eliminate the above problems, it has already been proposed to provide a subsidiary restricted brake pressure supply line in addition to a main unrestricted brake pressure supply line so that the main pressure line is blocked and the brake pressure is supplied only through the subsidiary line in the second and subsequent brake application. In the proposed arrangement, a solenoid valve is provided to alternately open the main and subsidiary lines to the wheel brake actuator.

The arrangement has been found disadvantageous, however, in that complicated electrical circuits must be provided for energizing the solenoid valve upon detection of wheel lock and holding the valve in the energized position throughout the second and subsequent application of brake. Further, the arrangement using such a solenoid valve has not been satisfactory in providing a stable and reliable operation.

It is therefore an object of the present invention to provide a novel vehicle anti-skid brake system which is particularly suitable for use in small-sized vehicles.

Another object of the present invention is to provide a vehicle anti-skid brake system having hydraulic means for restricting the brake pressure supply line upon detection of wheel lock.

A further object of the present invention is to provide a vehicle anti-skid brake system having regulator valve means which provides a restriction to the brake pressure supply line upon detection of wheel lock under the influence of hydraulic pressure from return pump means.

According to the present invention, the above and other objects can be accomplished by an anti-skid brake system comprising master cylinder means for providing upon actuation a supply of hydraulic brake pressure, wheel brake actuating means, brake pressure supply passage means between said master cylinder means and said wheel brake actuating means, fluid return passage means between said master cylinder means and said wheel brake actuating means, control valve means for opening when actuated said wheel brake actuating means to said fluid return passage means, skid control means for actuating said control valve means upon detection of skidding so that the wheel brake actuating means is opened to the fluid return passage means, fluid return pump means provided in said fluid return passage means, first check valve means provided between the return pump means and the wheel brake actuating means to allow fluid flow only toward the pump means, second check valve means provided between the return pump means and the master cylinder means to allow fluid flow only toward the master cylinder means, fluid pressure actuated regulating valve means for introducing upon actuation a restriction to the brake pressure supply passage means, valve actuating fluid passage means provided between the fluid return pump means an the regulating valve means. Most preferably, the valve actuating fluid passage means has third check valve means which allows fluid flow only toward the regulator valve means, said valve actuating fluid passage means is connected with the master cylinder means through fourth check valve means which allows fluid flow only toward the master cylinder means. The regulator valve means may include an unrestricted flow path and a restricted flow path which are alternately brought into the brake pressure supply passage means and the restricted flow path is positioned in the supply passage means when the regulator valve means is actuated. Alternatively, a restricted bypass passage may be provided in parallel with the regulator valve means which may in this case be formed simply as a shut-off valve for closing the pressure supply passage when it is actuated.

In normal operating condition, the regulator valve is in a position wherein unrestricted pressure supply passage means is provided and the control valve means is so positioned that it disconnects the wheel brake actuator from the return passage means. Thus, when the master cylinder is actuated, hydraulic pressure produced therein is transmitted through the brake pressure supply passage to the brake actuator means so that brake is applied to the associated wheel. When wheel lock or similar skidding condition is detected, the control valve is actuated or shifted to open the wheel brake actuator to the return passage so that the brake pressure in the actuator is at least partially released to restore rotation of wheel. The brake fluid in the return passage is then pumped by the return pump to the valve actuating fluid passage to actuated or shift the regulator valve to the position wherein the restriction is introduced into the brake pressure supply passage.

As soon as the wheel rotation is restored, the control valve is shifted back to the normal position wherein the brake actuator is connected with the brake pressure supply passage. In this instance, however, since the brake pressure supply passage is restricted, the rate of increase in the brake pressure in the actuator is slower than that in the first or initial application. The present invention is advantageous over prior art in that the arrangement is significantly simple because it is only required to additionally provide the valve actuating fluid passage. Further, the regulator valve can be shifted to and maintained in the actuated position in a stable and reliable manner by the hydraulic fluid pressure supplied from the return pump.

The above and other objects and features of the present invention will become apparent from the following descriptions of preferred embodiments taking reference to the accompanying drawings, in which:

FIG. 1 is a schematical view of the vehicle brake system in accordance with one embodiment of the present invention, wherein valves are shown in normal operating positions;

FIG. 2 is a view similar to FIG. 1 but showing the valves shifted upon detection of wheel locking;

FIG. 3 is a view similar to FIGS. 1 and 2 but showing the valve positions in second or subsequent application of brake;

Figure 4:
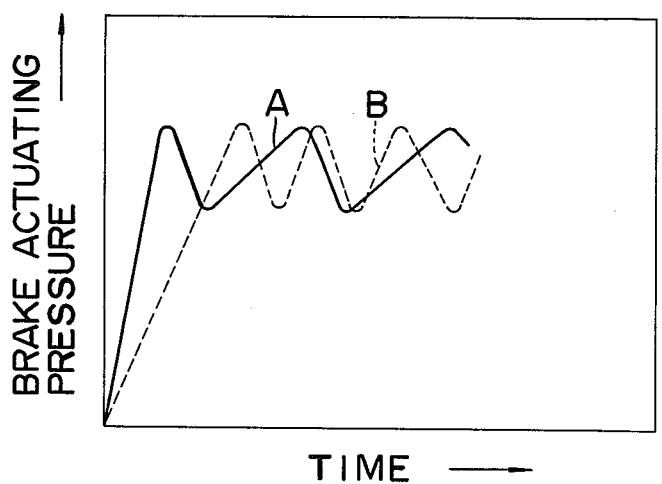
FIG. 4 is a diagram showing changes in pressure in a wheel brake actuator.

Referring now to the drawings, particularly to FIGS. 1 through 3, the vehicle brake system shown therein includes a master cylinder 1 which is actuated by a handle 2 and has a port connected through a brake pressure supply line 3 with a wheel brake actuator 4. There is further provided a fluid return line 8 in parallel with the pressure supply line 3 between the master cylinder 1 and the brake actuator 4. A control valve 7 is provided for alternately connecting the brake actuator 4 to the pressure supply line 3 and the return line 8. The control valve 7 is normally biased to a position wherein the actuator 4 is connected to the pressure supply line 3 but when energized it is shifted to the other position wherein the actuator 4 is connected to the return line 8. For this purpose, a solenoid 7a is provided in the control valve 7.

In the brake pressure supply line 3, there is disposed a pilot pressure actuated shut-off type regulator valve 5 and a bypass line 6 is formed in parallel with the valve 5. The bypass line has a restriction 6a.

In the fluid return line 8, there is provided a plunger type fluid return pump 11 which is driven by a rotatable cam 20. Most suitably, the cam 20 is driven by the wheel with which the brake system is associated. Between the return pump 11 and the control valve 7, a first check valve 9 is disposed in the return line 8 in such a manner that it allows fluid flow only in the direction toward the pump 11. Similarly, a second check valve 10 is disposed in the return line 8 between the pump 11 and the master cylinder 1 in such a manner that fluid flow is allowed only in the direction of the master cylinder 1.

In order to actuate the regulating valve 5, a pilot or valve actuating fluid line 15 is provided between the pump 11 and the regulating valve 5 so that fluid pressure is directed through a third check valve 13 to the valve 5. The line 15 is connected through a line 12 having a fourth check valve 14 to the master cylinder.

The brake system further includes an anti-skid brake control device 19 of a known type which serves to detect wheel locking or similar skidding condition and produce an output which is utilized to energize the solenoid 7a of the control valve 7.

In normal operation, the valves 5 and 7 are in the positions as shown in FIG. 1 so that the brake master cylinder 1 is connected through the pressure supply line 3 with the wheel brake actuator 4. Therefore, when the master cylinder 1 is actuated, the hydraulic fluid pressure produced therein is transmitted through the line 3 to the brake actuator 4 to apply braking effort to the associated wheel.

When wheel lock is detected, the control device 19 produces an output which is utilized to energize the solenoid 7a of the control valve 7. Thus, the control valve 7 is shifted to the position shown in FIG. 2 and the pressure in the actuator 4 is released to the return line 8. The braking force applied to the wheel is therefore released and the wheel rotation is gradually restored.

The fluid in the return line 8 is pumped by the return pump 11 but, since the output pressure of the master cylinder 1 is still high, it can only be introduced under pressure into the pilot line 15 of the regulating valve 5. The pressure thus introduced into the line 15 functions to shift the valve 5 to the shut-off position as shown in FIG. 2. The pressure in the line 15 is maintained as long as the output pressure from the master cylinder 1 exists.

As the wheel rotation is restored, the output from the control device 19 disappears and the solenoid 7a of the control valve 7 is de-energized. Thus, the control valve 7 is shifted back to the initial position as shown in FIG. 3. Therefore, the brake pressure is again supplied to the brake actuator 4. In this instance, however, since the regulating valve 5 is maintained in the shifted or close position, the brake pressure is transmitted only through the restricted bypass line 6. Therefore, the pressure in the brake actuator 4 increases at a slower rate as compared with the initial or first application of brake.

Referring specifically to FIG. 4, the solid line A diagrammatically shows the changes in pressure in the wheel brake actuator 4 in the illustrated brake system. It will be seen therein that the rate of increase in pressure in the second and subsequent application is slower than that of the first application. Without the regulating valve 5, however, the rate of the pressure increase will be the same in all applications as shown in dotted lines B in FIG. 4 so that the rate in the first application must be slower than that of the first application in the present invention in order to avoid excessive braking effort in the second or subsequent brake applications.

Figure 5:
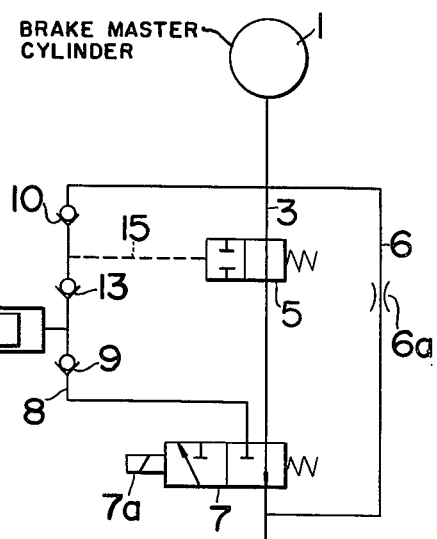
FIGS. 5 through 7 are schematical views of the vehicle brake systems showing further embodiments of the present invention.

Referring now to FIG. 5, the brake system shown therein is substantially the same as that shown in FIGS. 1 through 3 so that corresponding parts are shown by the same reference numerals as in FIGS. 1 through 3. One of the features in this embodiment is that a third check valve 13 is disposed between the return pump 11 and the second check valve 10 and the pilot pressure line 15 extends from a point between the check valves 10 and 13 to the regulating valve 5. Further, the bypass line 6 is connected to the line 3 at a point between the control valve 7 and the actuator 4. It will readily be understood that the arrangement provides a function which is identical to that of the previous embodiment. The arrangement is considered as being advantageous in that a certain amount of pressure supply is maintained even if there is a discrepancy in either or both of the valves 5 and 7.

Figure 6:
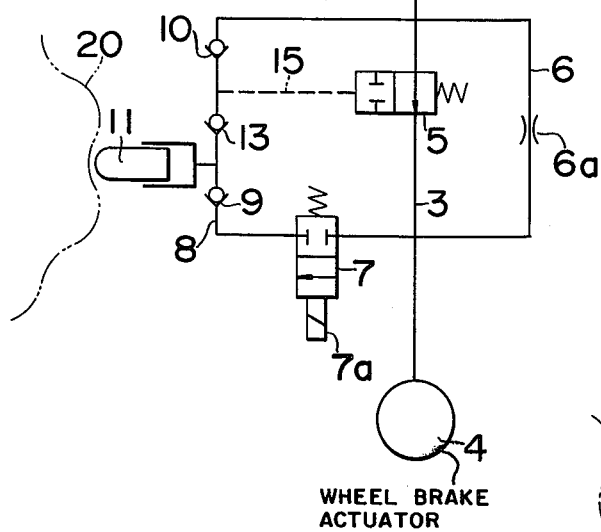

FIG. 6 shows another embodiment of the present invention which is similar to that shown in FIG. 5 but the control valve 7 is in the form of a shut-off valve and disposed in the return line 8. In normal operation of the brake system, the valve 7 closes the return line 8 but, upon detection of wheel lock or similar condition, the solenoid 7a is energized and the valve 7 is shifted to the open position so that the pressure in the actuator 4 is released to the return line. Subsequent operations will be the same as in the previous embodiments.

Figure 7:
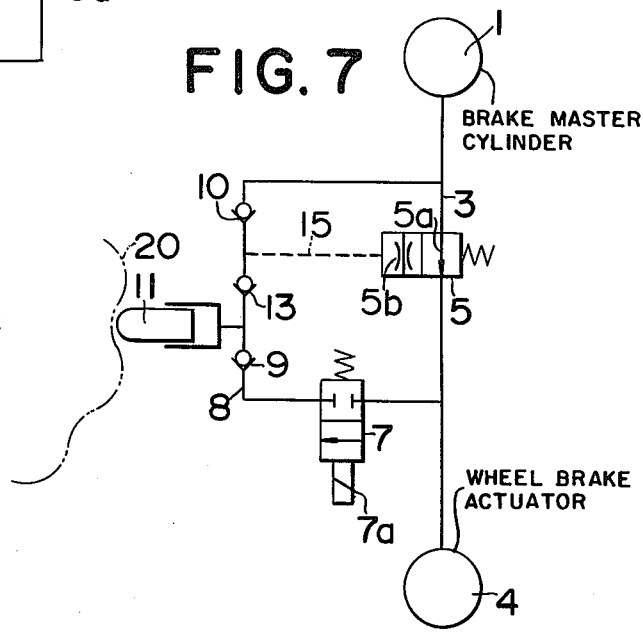

Referring further to FIG. 7, there is shown another embodiment of the present invention which is similar to that shown in FIG. 6 but the regulator valve 5 includes an unrestricted flow path 5a and a restricted flow path 5b which are alternately brought into the pressure supply line 3. Further, the bypass line 6 in the previous embodiments is omitted in this arrangement.

In the embodiments described above, the return line may be provided with an additional return pumps which is different in phase from the first return pump 11. Alternatively, a multiple plunger pump may be used in lieu of the pump 11. By this arrangement, the pressure in the actuator 4 can at once be withdrawn by the return pump as soon as the control valve 7 is shifted.

The invention has thus been shown and described with reference to specific embodiments, however, it should be noted that the invention is in no way limited to the details of the illustrated arrangements but changes and modifications may be made without departing from the scopes of the appended claims.

I claim:

1. Anti-skid brake system comprising master cylinder means for providing upon actuation a supply of hydraulic brake pressure, wheel brake actuating means, brake pressure supply passage means between said master cylinder means and said wheel brake actuating means, fluid return passage means between said master cylinder means and said wheel brake actuating means for return of hydraulic fluid, control valve means for opening when actuated said wheel brake actuating means to said fluid return passage means, skid control means for actuating said control valve means upon detection of skidding so that the wheel brake actuating means is opened to the fluid return passage means, fluid return pump means provided in said fluid return passage means for return of said hydraulic fluid through said passage means, first check valve means provided between the return pump means and the wheel brake actuating means to allow fluid flow only toward the pump means, second check valve means provided between the return pump means and the master cylinder means to allow fluid flow only toward the master cylinder means, fluid pressure actuated regulating valve means for introducing upon actuation a restriction to the brake pressure supply passage means, valve actuating fluid passage means provided between the fluid return pump means and the regulating valve means, third check valve means which is disposed between said fluid return pump means and the second check valve means and allows fluid flow only toward the second check valve means, said valve actuating fluid passage means being connected with said fluid return passage means at an area between said second and third check valve means.

2. Anti-skid brake system in accordance with claim 1 in which bypass passage means is provided in said brake pressure supply passage means across said regulating valve means, said bypass passage means having a restriction and said regulating valve means being of a shut-off type which is adapted to be brought into shut-off position for introducing the restriction to the brake pressure supply passage means.

3. Anti-skid brake system in accordance with claim 2 in which said bypass passage means is connected to the brake pressure supply passage means at one end between the master cylinder means and the regulating valve means, at the other end between said control valve means and said regulating valve means.

4. Anti-skid brake system in accordance with claim 2 in which said bypass passage means is connected to the brake pressure supply passage means at one end between the master cylinder means and the regulating valve means, at the other end between the control valve means and the wheel brake actuating means.

5. Anti-skid brake system in accordance with claim 1 in which said regulating valve means includes an unrestricted flow path and a restricted flow path, said unrestricted flow path being normally positioned in the brake pressure supply passage means, said restricted flow path being adapted to be brought into the brake pressure supply passage means in place of the unrestricted flow path when said regulating valve means is actuated.

6. Anti-skid brake system in accordance with claim 1 in which said control valve means is selector valve means for connecting said wheel brake actuating means alternately with said brake pressure supply passage means and said fluid return passage means.

7. Anti-skid brake system in accordance with claim 1 in which said control valve means is of shut-off type provided in said fluid return passage means for normally closing the same.

* * * * *